(12) United States Patent
Chan

(10) Patent No.: US 6,473,860 B1
(45) Date of Patent: Oct. 29, 2002

(54) INFORMATION DISTRIBUTION AND PROCESSING SYSTEM

(76) Inventor: Hark C. Chan, 861 Brent Dr., Cupertino, CA (US) 95014

(*) Notice: Subject to any disclaimer, the term of this patent is extended or adjusted under 35 U.S.C. 154(b) by 0 days.

(21) Appl. No.: 09/177,681

(22) Filed: Oct. 22, 1998

Related U.S. Application Data

(63) Continuation-in-part of application No. 08/939,368, filed on Sep. 29, 1997, which is a continuation-in-part of application No. 08/644,838, filed on May 10, 1996, now abandoned, which is a continuation-in-part of application No. 08/279,424, filed on Jul. 25, 1994, now abandoned, which is a continuation-in-part of application No. 08/255,649, filed on Jun. 8, 1994, now abandoned, which is a continuation-in-part of application No. 08/224,280, filed on Apr. 7, 1994, now abandoned.

(51) Int. Cl.[7] ............................. H04L 9/32; H04L 9/00
(52) U.S. Cl. .................. 713/193; 713/151; 705/51; 705/57
(58) Field of Search .............................. 713/151, 193; 705/51, 52, 57; 380/54

(56) References Cited

U.S. PATENT DOCUMENTS

| | | |
|---|---|---|
| 3,824,597 A | 7/1974 | Berg |
| 3,967,202 A | 6/1976 | Batz |
| 4,081,832 A | 3/1978 | Sherman |
| 4,191,860 A | 3/1980 | Weber |
| 4,307,416 A | 12/1981 | Spano |
| 4,563,702 A | 1/1986 | Heller |
| 4,635,113 A | 1/1987 | Okada et al. |
| 4,694,490 A * | 9/1987 | Harvey et al. ............... 380/284 |
| 4,734,858 A | 3/1988 | Sclafy ........................ 364/408 |
| 4,742,544 A | 5/1988 | Kupnicki et al. ............. 380/14 |
| 4,827,508 A | 5/1989 | Shear |
| 4,860,352 A | 8/1989 | Lawrence et al. ............ 380/23 |
| 4,965,825 A | 10/1990 | Harvey et al. |
| 4,987,595 A * | 1/1991 | Marino, Jr. et al. ........... 380/50 |
| 5,010,571 A | 4/1991 | Katznelson |
| 5,029,206 A * | 7/1991 | Marino, Jr. et al. ............. 380/4 |
| 5,128,981 A * | 7/1992 | Tsukamoto .................. 455/450 |
| 5,132,680 A | 7/1992 | Tezuka et al. ......... 340/825.08 |
| 5,185,794 A | 2/1993 | Thompson et al. ............ 380/17 |
| 5,208,671 A | 5/1993 | Tarrant ....................... 358/147 |
| 5,208,857 A | 5/1993 | Lebrat ........................ 380/14 |
| 5,214,697 A * | 5/1993 | Saito ............................ 380/4 |

(List continued on next page.)

OTHER PUBLICATIONS

David Raggett, HTML +(Hypertext Markup Language), pp. 1–31, Jul. 12, 1993, WWW Discussion Group Request for Comments.

S. Deering, "Host Extensions for IP Multicasting", pp. 1–17, Aug. 1989, Network Working Group, Request for Comments: 1112.

Cricket Liu, et al., "Managing Internet Information Services", pp. 279–298, Dec., 1994, O'Reilly & Associates, Inc.

John P. Hayes, "Computer Architecture and Organization", pp. 398–421, Jan. 1988.

*Primary Examiner*—Gilberto Barron
*Assistant Examiner*—Kambiz Zand

(57) ABSTRACT

Digital information is separated into two portions. The first portion is a clear portion and the second portion is encrypted. The clear portion and an identification label are distributed to a plurality of processing units. Some of the processing units send the identification label to a remote station and receive the encrypted portion. They decrypt the received encrypted portion and combine the decrypted data with the clear portion to generate a graphic image. In another embodiment, the first portion can also be encrypted at a different level of security as the second portion.

23 Claims, 4 Drawing Sheets

U.S. PATENT DOCUMENTS

| | | | |
|---|---|---|---|
| 5,237,411 A | | 8/1993 | Fink et al. .................. 358/146 |
| 5,239,540 A | | 8/1993 | Rovira et al. ................. 370/77 |
| 5,247,347 A | | 9/1993 | Litteral et al. |
| 5,247,575 A | | 9/1993 | Sprague et al. |
| 5,283,828 A | * | 2/1994 | Saunders et al. .............. 380/4 |
| 5,319,707 A | | 6/1994 | Wasilewski et al. .......... 380/14 |
| 5,321,748 A | | 6/1994 | Zeidler et al. ................ 380/14 |
| 5,321,750 A | | 6/1994 | Nadan ......................... 380/20 |
| 5,323,148 A | | 6/1994 | Olazabal et al. ....... 340/825.44 |
| 5,327,174 A | | 7/1994 | Kim ........................... 348/468 |
| 5,335,275 A | | 8/1994 | Millar et al. ................... 380/4 |
| 5,335,278 A | * | 8/1994 | Matchett et al. ............ 380/248 |
| 5,343,494 A | | 8/1994 | Averst et al. .................. 375/1 |
| 5,361,399 A | * | 11/1994 | Linquist et al. ............. 455/412 |
| 5,365,591 A | * | 11/1994 | Carswell et al. ............ 380/49 |
| 5,377,266 A | | 12/1994 | Katta et al. ................... 380/20 |
| 5,381,476 A | * | 1/1995 | Kimoto et al. .............. 380/201 |
| 5,383,185 A | * | 1/1995 | Armbruster et al. ....... 370/85.3 |
| 5,384,835 A | * | 1/1995 | Wheeler et al. ......... 379/93.25 |
| 5,388,101 A | | 2/1995 | Dinkins .................... 370/95.1 |
| 5,392,023 A | | 2/1995 | D'Avello et al. ........... 379/100 |
| 5,392,353 A | | 2/1995 | Morales ...................... 380/20 |
| 5,432,798 A | | 7/1995 | Blair .......................... 371/32 |
| 5,444,769 A | | 8/1995 | Koen et al. .................... 379/94 |
| 5,452,356 A | | 9/1995 | Albert ........................... 380/9 |
| 5,539,449 A | | 7/1996 | Blahut et al. .................. 348/7 |
| 5,563,946 A | | 10/1996 | Cooper et al. ................ 380/28 |
| 5,613,004 A | | 3/1997 | Cooperman et al. .......... 380/28 |
| 5,629,867 A | | 5/1997 | Goldman .................... 364/514 |
| 5,697,844 A | | 12/1997 | Von Kohom ................ 370/310 |
| 5,757,913 A | * | 5/1998 | Bellare et al. .............. 713/168 |
| 5,778,076 A | * | 7/1998 | Kara et al. .................... 380/51 |
| 5,870,474 A | * | 2/1999 | Wasilewski et al. .......... 380/21 |
| 5,887,065 A | | 3/1999 | Audebert ..................... 380/23 |
| 5,887,243 A | | 3/1999 | Harvey et al. ............... 455/3.1 |
| 5,899,998 A | | 5/1999 | McGauley ................. 707/104 |
| 5,995,628 A | * | 11/1999 | Kitaj et al. ................... 380/49 |
| 6,005,938 A | * | 12/1999 | Banker et al. ................ 380/20 |
| 6,078,612 A | * | 1/2000 | Bertrand et al. ............ 375/219 |

\* cited by examiner

INFORMATION DISTRIBUTION AND PROCESSING SYSTEM

This application is a continuation in part of application Ser. No. 08/939,368 filed Sep. 29, 1997, which is a continuation in part of application Ser. No. 08/644,838 filed May 10, 1996, now abandoned, which is a continuation in part of application Ser. No. 08/279,424 filed Jul. 25, 1994, now abandoned, and application Ser. No. 08/255,649 filed Jun. 8, 1994, now abandoned, which is a continuation in part of application Ser. No. 08/224,280 filed Apr. 7, 1994, now abandoned. These five patent applications are incorporated herein by reference.

BACKGROUND OF THE INVENTION

The present invention relates to method and apparatus for distributing and processing information, and more specifically relates to method and apparatus for preventing unauthorized use of information by partially encrypting such information.

With the advance of electronic and communication technology, information conveyed in electronic form ("electronic content") is fast becoming the most economic and reliable way of distributing information. However, many information providers are reluctant to distribute electronic content because it is very easy to copy and use the information without authorization. In spite of the existence of copyright law, experience shows that electronic content are often copied and used without paying any royalties to copyright holders. Thus, in order to promote the use of electronic conveyance of information, means must be develop to prevent unauthorized usage and copying of electronic content.

Methods have been developed to prevent unauthorized copying of electronic content. Several years ago, these methods were used by many software developers. However, these copy protection methods do not find acceptance in the market place. Consequently, the majority of computer software is currently marketed without copy protection.

Recently, attention has been turned towards preventing unauthorized uses. For example, several companies market "dongles," or hardware keys, which are attached to a port of a computer. Protected software would not execute in a computer without an appropriate key. Thus, the protected software could be copied but cannot be used in an unauthorized computer. However, many users found that these software and hardware keys cause much inconvenience. For example, when a user wishes to remove the software from one computer and execute the software in another computer, the associated hardware key has to be moved. So far, no mass marketed software uses hardware key to protect against unauthorized uses.

Other methods have been developed to prevent unauthorized usage of electronic content. One of the methods is disclosed in U.S. Pat. No. 5,010,571 issued to Katznelson. It discloses a system for controlling and accounting for retrieval of data from an optical storage medium containing encrypted data files from which retrieval must be authorized. The optical storage medium is distributed to customers at nominal or no charge. However, in order to decrypt the data files, a customer must obtain a decryption key from a remote authorization and key distribution station. As a result, unauthorized uses can be prevented. A similar system is disclosed in U.S. Pat. No. 4,827,508 issued to Shear. In Shear, the decryption key is stored in a secure device in the customer site. The secure device also stores accounting data relating to usage of the electronic content. The accounting data is periodically sent to a billing station.

In the above methods disclosed by Katznelson and Shear, vast amount of distributed information is encrypted using a single key (or a small number of keys). Thus, if the decryption key is inadvertently made public, all these information can be used without paying the information providers. Naturally, information providers are reluctant to rely on these methods to distribute their valuable asset (i.e., information).

Another problem with these prior art methods is that information providers cannot match the security level of encryption to the value of the information. Typically, the security of encryption is directly related to the complexity of encryption algorithm and the length of keys. The choice of encryption algorithms and the length of keys require an analysis of the value of the information and the costs of encryption. In the methods disclosed by Katznelson and Shear, all information is encrypted using the same key. Thus, this key may not match the requirements of many information providers.

A further problem of these prior art method is that the encryption algorithm is fixed at the time encrypted information is initially distributed. As the installed base of encrypted information increases, it becomes difficult to change the encryption algorithm. Thus, these methods cannot use new cryptographic methods, which may be developed in future.

Another method is disclosed in U.S. Pat. No. 5,247,575 issued to Sprague et al. It discloses that encrypted information may be electronically transmitted from a remote site to a receiving device in a customer site via wired or wireless means. It also discloses that the decryption key could be stored in a removable "key" card. The card can be inserted into the receiving device to decrypt the received and encrypted data. This method suffers the same defects described above in connection with Katznelson and Shear. In addition, this method requires a communication channel having a large bandwidth for transmitting the encrypted information.

SUMMARY OF THE INVENTION

Broadly stated, the invention involves a method and system for distributing and processing digital information. The digital information is separated into two portions. The first portion is a clear portion and the second (residual) portion is encrypted. The clear and the encrypted portions are sent to a processing system that decrypts the encrypted portion. The clear and decrypted portion is combined to obtain a result that is substantially the same as the original digital information.

In one embodiment of the present invention, the clear portion is distributed to customers at no or nominal cost. The residual portion will be stored in a central station. When a customer wishes to use the digital information, the central station encrypts the residual portion using an encryption-decryption key-pair generated at that time. The encrypted portion and the decryption key are sent to the processing system in a secure manner. As a result, different keys can be used to encrypt and decrypt the same information at different times.

One feature of the present invention is that the clear portion is selected in a way to render the reconstruction of the original digital information difficult if the residual portion is not known. Thus, a customer will not be able to reconstruct the original digital information based on the clear portion. As a result, unauthorized use of the digital information is prevented.

In the present invention, the information providers control the choice of encryption algorithms and keys. Further, algorithms and keys can be changed at will.

These and other features and advantages of the present invention will be fully understood by referring to the following detailed description in conjunction with the accompanying drawings.

DETAILED DESCRIPTION OF THE INVENTION

Figure 1:
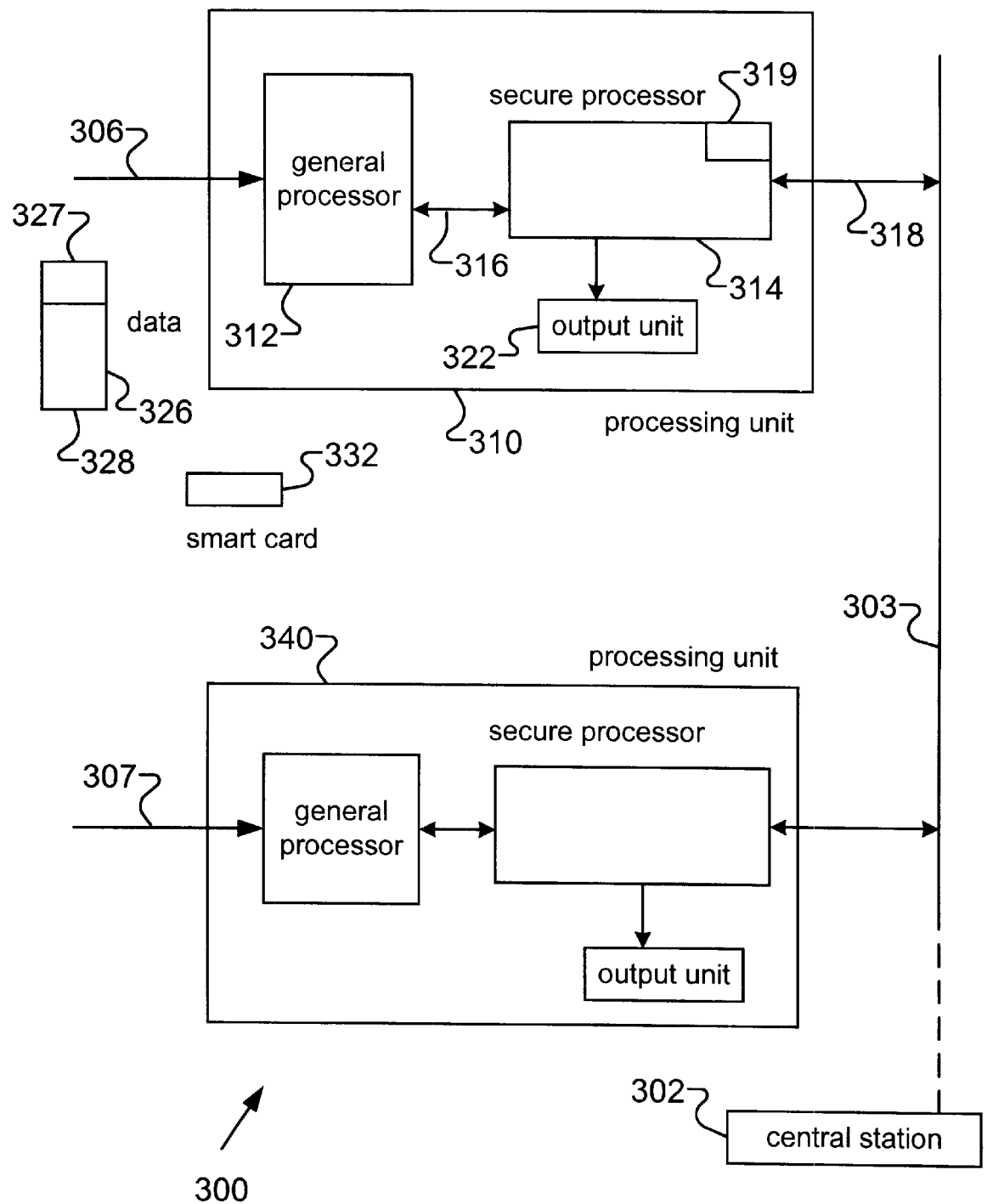
FIG. 1 is a block diagram of an information distribution and processing system in accordance with the present invention.

FIG. 1 is a block diagram of an information distribution and processing system 300 in accordance with the present invention. System 300 contains a central station 302 which is connected via a communication link 303 to a plurality of processing units located in subscriber sites, such as units 310 and 340. Processing units 310 and 340 are also connected to communication links 306 and 307, respectively. Communication links 306 and 307 are preferably not connected to central station 302, but may be connected thereto when needed. Communication links 303, 306, and 307 could be wired or wireless, remote or local, point-to-point or broadcasting.

Digital information to be distributed is separated into clear (i.e., unencrypted) portions and residual portions in accordance with methods described below. The residual portions are essentially the digital information with the clear portions removed. The clear portions are sent to processing units 310 and 340 via links 306 and 307, respectively. The residual portions are stored in central station 302 and will be encrypted before sending to processing units 310 and 340 upon demand. Central station 302 also takes care of various accounting and bookkeeping functions.

The structure of the processing units is substantially the same. Thus, only one of the units, in this case, unit 310, will be described in detail. Unit 310 contains a general processor 312 connected to a secure processor 314 through a communication link 316 (which could be wired or wireless). Secure processor 314 is connected to communication link 303 through a line 318. Secure processor 314 is enclosed by a protective mechanism so that unauthorized access (physical and electrical) to the internal circuitry can be prevented. Secure processor 314 is used to decrypt encrypted portions and temporarily store secret information (such as decryption keys and usage data). Unlike secure processor 314, general processor 312 does not have to be placed in a secure enclosure. Thus, it could be a conventional computer.

In system 300, general processor 312 is used to process the unencrypted data (e.g., decompression, filtering, and error correction) received from communication link 306 while secure processor 314 is used to process encrypted data (e.g., decryption and decompression) received from communication link 303. Secure processor 314 and general processor 312 can communicate with each other using communication link 316. This link does not have to be a secure communication link.

Secure processor 314 preferably contains a unique device ID. This device ID is preferably permanently stored in a nonvolatile memory 319, such as a ROM. The device ID allows secure processor 314 to identify itself to other devices, such as central station 302.

A typical operation of system 300 is now described. Information data is separated in residual data and unencrypted data according to methods described below. The residual data is preferably a small percentage of the unencrypted data. Unencrypted data 326 preferably contains an information ID 327 and a content portion 328. Content portion 328 could contain data relating to video, text, audio, or their combination.

Unencrypted data 326 is sent to general processor 312 of processing unit 310 through communication link 306. General processor 312 sends the information ID 327 to secure processor 314, which in turn forwards it to central station 302 via communication link 303. At the same time, the device ID stored in memory 319 is also sent to central station 302 so that it can keep track of usage and billing information. Central station 302 encrypts the corresponding residual data and sends the encrypted data to secure processor 314 via communication link 303. Because link 303 is not a secure link, special methods, described below, need to be used for central station 302 to securely send the corresponding decryption key to secure processor 314. Secure processor 314 decrypts the received encrypted data and combines the result with the unencrypted data so as to reconstruct the full digital information.

The key used for encrypting and decrypting the encrypted data could be different for each processing and communication session described above. Thus, it is more difficult for unauthorized persons to obtain the decryption key to decrypt the encrypted data. Even assuming that a few decryption keys are inadvertently disclosed to unauthorized persons, only a few pieces of information is compromised. This is different from the system disclosed in the prior art, where inadvertent disclosure of a single decryption key may compromise vast amount of information.

Processing unit 310 also contains an output unit 322, which may be connected to general processor 312 or secure processor 314. Depending on the information processed, output unit 322 may be a printer, loudspeaker, TV, or LCD display. In situations where it is not desirable to expose the reconstructed information, output unit 322 should be securely connected to secure processor 314.

Even though FIG. 1 shows secure processor 314 as a single block, the function of secure processor 314 could be carried out in several components. For example, the device ID could be stored in a smart card 332 that is removably connected to processing unit 310. Smart card 332 should be protected from unauthorized intrusion.

Methods for separating information into unencrypted and residual portions are now described. It has been observed that information generally has a certain degree of correlation. At one extreme is information that is highly correlated. An example is video information that consists of a series of pictures depicting time progression of a scene. Each picture typically differs slightly from an adjacent picture in the series because the time difference in the scene depicted by adjacent pictures is typically less than 0.1 second. As a result, video information contains many pictures that are substantially the same. Consequently, it is easy to construct a picture missing from the series by interpolating from the pictures prior and subsequent to the missing picture. This type of information is considered to have a high degree of temporal correlation.

Video information also has another type of correlation. The spatial variation of a picture is typically very gentle. For example, if the picture is a human swimming in water, there is little variation (in terms of color and intensity) in the portion of the picture relating to water. Consequently, it may be easy to recreate a missing portion of a picture by interpolating from portions of the picture surrounding the missing portion. This type of information is considered to have a high degree of spatial correlation.

At the other extreme is information for which it is difficult to create a missing portion from other portions. This type of information has a low degree of correlation. An example of this type of information is the binary code of a piece of software. Typically, it is difficult to recreate a missing byte (or a series of missing bytes) from other bytes in the binary code.

In the middle of this spectrum of correlation is text information. The structure of many languages dictates that redundant words or letters be used at predetermined positions of a sentence. Thus, it is possible to guess missing words and letters in a sentence. For example, the grammar of the English language imposes a set of rules which includes putting the letter "s" at the end of a noun to designate plural quantity. In many sentences, the noun is not the only place where plural quantity is indicated. For example, the sentence "there are two birds" uses the word "two" to indicate the existence of more than one bird, in addition to the letter "s" attached to the word "bird." Thus, the letter "s" at the end of the word "bird" is correlated to the word "two" in the above sentence. Similarly, the word "are" is correlated with the word "two."

Information can also be classified according to its effect on intended uses if a portion of the information is missing. At one extreme is information that would be useless if a small portion were missing. An example is the binary code of a piece of software. A computer is unlikely to successfully execute the software if the binary code has a few erroneous bytes. This type of information is considered to be error intolerant. At the other extreme is information that degrades gracefully. For example, when noise of TV signal increases (i.e., portions of video information is missing or has erroneous values), color TV pictures often become monochrome. However, it is still possible to watch and comprehend the TV pictures, even though they are less pleasing to the eyes. This type of information is considered to be error tolerant. Error toleration can also be different depending on spatial or temporal types of errors.

It should be pointed out that even though the degree of error tolerance has some relationship to the degree of correlation of information, it does not depend solely on the degree of correlation. For example, a person typically does not tolerate a small distortion in a familiar song while may tolerate a large distortion in a new song, even though the degree of correlation of these two songs is the same. As another example, a reader is likely to tolerate a large number of missing words in a newspaper article. On the other hand, the same reader probably would not tolerate the same percentage of missing words in a poem. Thus, even though the degree of correlation of the newspaper article and poem may be the same (because they follow essentially the same grammar rules), the degree of error tolerance is different. This is because error tolerance depends, to a certain extent, on subjective considerations.

In the prior art information distribution and processing systems using cryptography, every bit of information is encrypted. One aspect of the present invention is the realization that it may not be necessary to completely encrypt the information, especially when it has a low degree of correlation. This is because it is often difficult to reconstruct the residual portions based on the clear portions of information. In addition, information that has a low degree of error tolerance may only need to be encrypted at a few critical places (e.g., the destination address of a jump op code, or the last name field of a customer database). This is because a user would not accept the information if a small portion were missing or erroneous. Thus, even though most of the information is in the clear, it is still not commercially useful if isolated portions are unavailable because they cannot be decrypted (i.e., people are still willing to pay a high price to obtain the full information, even though they already have 99 percent of the information). Since only a small portion of information need to be decrypted, the amount of computation power required to decrypt the information is reduced.

Encrypting a portion of information may also help to reduce the computation power required for other signal processing tasks. As an example, information which is massive and highly correlated (e.g., video information) is often compressed in order to reduce the amount of memory space used for storing and the bandwidth used for transmitting the information. Many compression methods make extensive use of the correlative nature of information. However, many encryption methods have a tendency to randomize information. For example, if the plain text is a string of identical letters, the encrypted text using algorithms such as DES may be a string of letters in which every letter is different. Consequently, it may be more difficult to compress the encrypted text.

The word "encryption" is used broadly in the present invention to include different ways of transforming information so that it is difficult for an unauthorized person to correctly understand the information. It includes transformation in which a key is required, such as public key and secret key encryption methods. It also includes scrambling information according to a secret algorithm without using a particular parameter that may be classified as a "key."

The word "information" is used broadly in the present invention to include data that is organized in some logical manner. Examples of information include video signal, audio signal, picture, graphic, computer software, text, database, and multimedia composition.

In another embodiment of the present invention, information is encrypted in different levels of security. In this embodiment, most of the information is encrypted using a method having a low level of security (instead of no encryption, as are the embodiments described above) and a portion of the information is encrypted using a method having a high level of security. Typically, the amount of computational power needed for decryption is positively related to the level of security. Thus, information encrypted using a method having a low level of security requires less time to decrypt.

An example of distributing graphic images using the above-described method is now described. Because of the rich information content of graphic images, they require a large number of bytes to digitize. Consequently, it is common to compress the digitized graphic images. One of the most popular methods is JPEG (Joint Photographic Experts Group). An application of the present invention to JPEG is now described. It should be appreciated that the same principle can be applied to other methods of processing graphic images.

It is known that human eye is less sensitive to color changes than to brightness changes. Thus, the chrominance component can be coded with more loss than the luminance component. For example, a widely used color scheme is CCIR 601, in which three components, Y, $C_b$, and $C_r$, are used. Under this color scheme, the Y component roughly represents the brightness of a color image, and can be used as a black-and-white version of the color image. The $C_b$ and $C_r$ components roughly represent the blueness and redness, respective, of the image.

JPEG works best when applied to color data expressed as luminance (brightness) and chrominance components because it allows these components to be sampled at different rate (i.e., subsampling). When JPEG is used to compress a $YC_bC_v$ image, a fair common choice is to use one $C_b$ and $C_r$ sample for each four Y samples. Each of the sampled components is discrete cosine transformed and then quantized in accordance with a quantization table. The results of quantization are compressed using either a modified Huffman code or arithmetic coding.

If color fidelity is an important element of the images, it may be sufficient to encrypt only the $C_b$ or $C_r$ component in order to prevent unauthorized uses. In this case, only a small portion of the digital data needs to be encrypted.

The quantization table is stored in a JPEG file. In some situations, it may be sufficient to only encrypt the quantization table. Again, only a small portion of the digital data needs to be encrypted.

Figure 2:
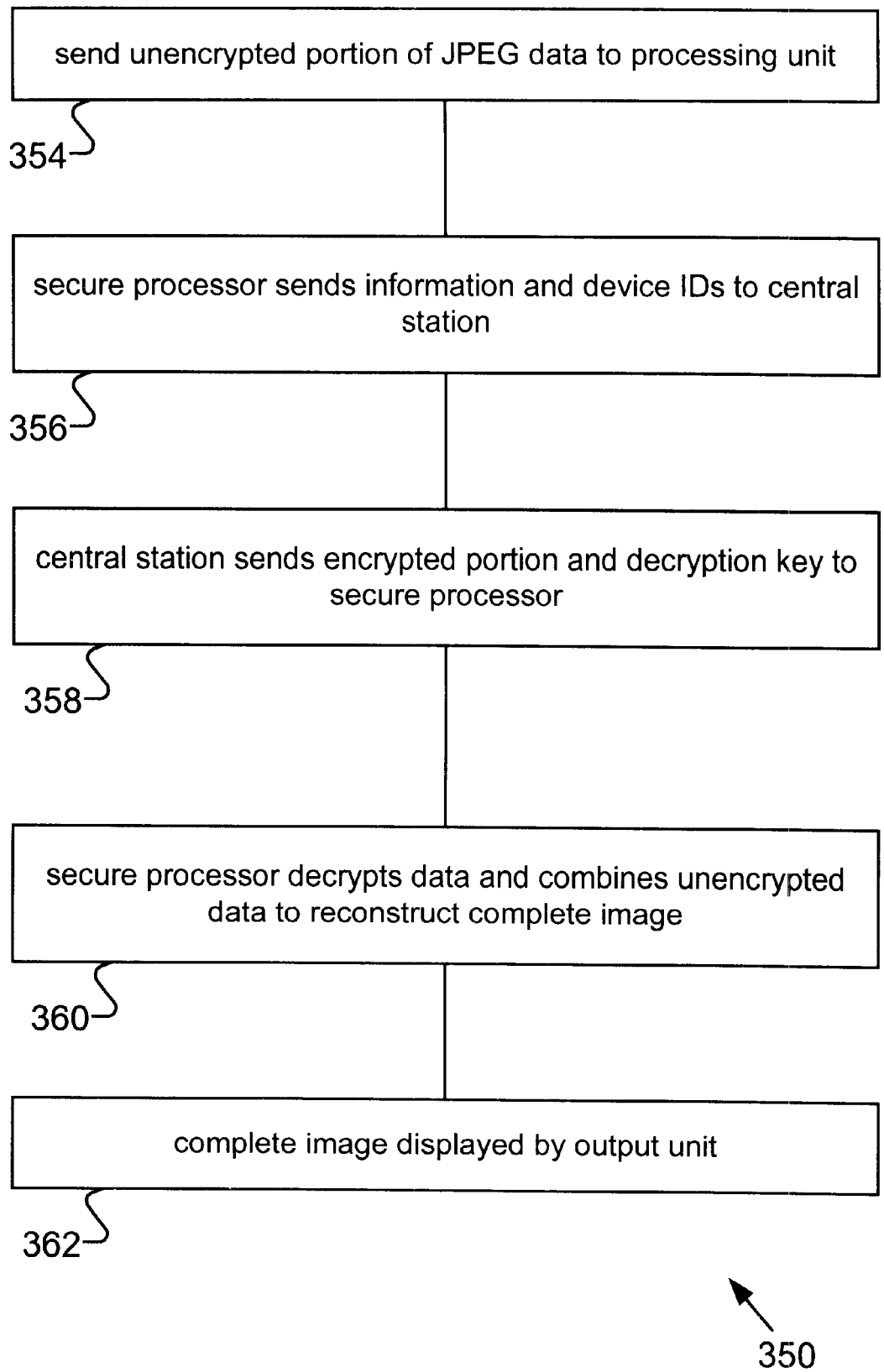
FIG. 2 is a flow chart showing the application of the present invention to JPEG.

FIG. 2 is a flow chart 350 showing a method of using the information distribution and processing system 300 of FIG. 1 to distribute and process graphic images in JPEG form. The JPEG data is separated into unencrypted and residual portions according to the method described above. The unencrypted portion of the JPEG file is sent to processing unit 310 through communication link 306 (step 354). For example, the unencrypted portion could be stored in an on-line bulletin board system and downloaded to processing unit 310 through a regular phone line. Alternatively, the unencrypted portion could be recorded in a portable memory medium (e.g., floppy diskettes, tapes, or CD-ROMs) and distributed to potential customers. General processor 312 reads the information ID 327 and causes the secure processor 314 to send the information ID and its device ID to central station 302 (step 356). Central station 302 then encrypts the residual portions and sends the encrypted portion (e.g., quantization table) to secure processor 314. Central station 302 also sends the decryption key to secure processor 314 using one of the well-known secure communication protocols (step 358). Secure processor 314 decrypts the data and causes general processor 312 to send the unencrypted JPEG portion thereto for generating a complete image (step 360). The image is sent to the output unit 322 for display (step 362).

Figure 3:
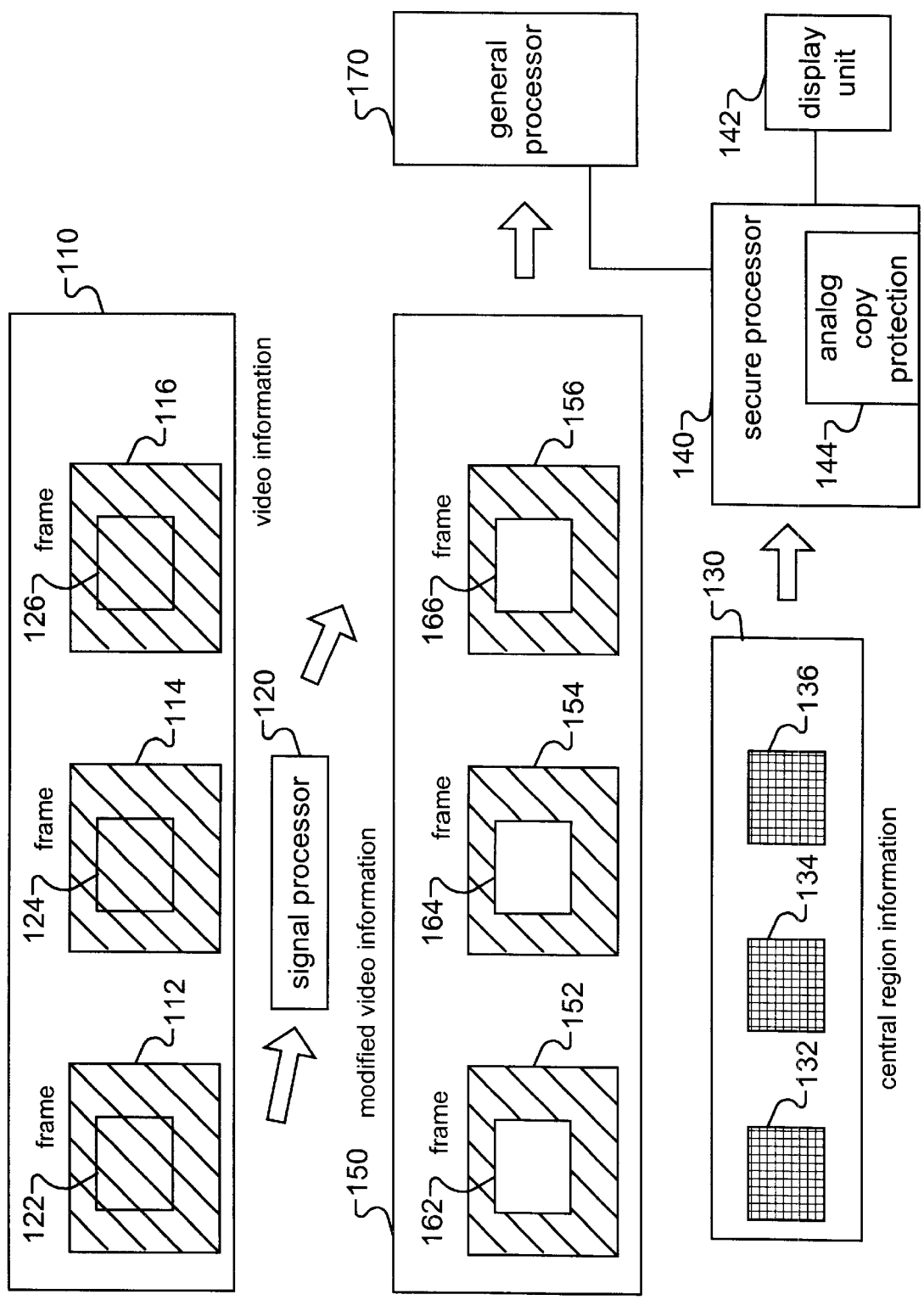
FIG. 3 is a schematic diagram showing the application of the present invention to video data.

FIG. 3 is a diagram showing one embodiment in which information having a high degree of correlation, such as video information 110, is processed with an information distribution and processing system of the present invention. Only three frame 112, 114 and 116 of video information 110 are shown, although video information 110 typically contains a large number of frames. Frames 112, 114, and 116 each has a centrally located region 122, 124, and 126, respectively, which are of similar size and shape. Only these regions are encrypted while the rest of the frames are in the clear. The area of each of these regions is preferably small compared to the size of a full frame.

Video information 110 is separated by a signal processor 120 into modified video information 150 and central region information 130. The three frames 112, 114, and 116 of the video information 110 are transformed into three frames 152, 154, and 156, respectively, of modified video information 150. Frames in the modified video information 150 do not contain information in the centrally located regions 162, 164, and 166 (which correspond to centrally located regions 122, 124, and 126, respectively). On the other hand, the frames 132, 134, and 136 in the central region information 130 contain only information relating to the centrally located regions 122, 124, and 126.

In the method of the present invention, only the centrally region information 130 needs to be encrypted while the modified video information 150 can stay in the clear. The modified video information 150 is sent to general processor 170, which corresponds to general processor 312 of FIG. 1. The central region information 130 is sent to secure processor 140, which corresponds to secure processor 314 of FIG. 1. The secure processor 140 decrypts the encrypted frames 132, 134, and 136 and combine them with frames 152, 154, and 156 to reconstruct the video images. These images are displayed by a display unit 142, which corresponds to output unit 322 of FIG. 1. In order to prevent unauthorized recording of the analog signal, it may be desirable to include a system of analog copy protection 144 in secure processor 140.

In this embodiment, substantially the same region of all the frames (i.e., frames corresponding to all times from beginning to end) are encrypted. Thus, it is not possible for an unauthorized person to take advantage of temporal correlation to reconstruct the centrally located regions because there is no basis to perform interpolation. It is also difficult to take advantage of spatial correlation near the center of the frame because there is little unencrypted data available at areas surrounding the center.

Stated in a slightly different way, the method disclosed above encrypts substantially all the correlated portions of the information. Since almost none of the correlated portions are in the clear, it is impossible to bypass the correlated portions by using techniques such as interpolation.

The size of the regions 122, 124 and 126 depends on the degree of error tolerance. If spatial error tolerance is low (i.e., a user will not tolerate even a small amount of erroneous spatial information), the size of the regions 122, 124 and 126 could be small. Further, for situations where temporal error tolerance is low, it is not necessary to encrypt the entire frame.

The reason for positioning the encrypted region at the center is to take advantage of the fact that the most informative area of a picture is usually the center. It may be advantageous to encrypt several regions (instead of only one centrally located region). This is because the most informative region in some cases may not be located at the center. Further, the size and shape of the encrypted regions may vary from frame to frame, as long as information relating to these sizes and shapes is transmitted to secure processor 140. As a result, secure processor 140 is able to reconstruct the video frames.

The encrypted region can also be selected using statistical methods. For example, the correlation within and between frames can be determined by a correlation coefficient r defined as $$r = E[(X-a)(Y-b)]/uv;$$

where X and Y are jointly distributed random variables with means a and b and variances $u^2$ and $v^2$, respectively. A region is selected for encryption when the corresponding correlation coefficient is higher than a certain value. Various statistical methods for determining appropriate selection criteria are well known in the art. These statistical methods can be used by signal processor 120.

FIG. 3 indicates that adjacent frames of video information 110 have the same format and contain the same type of information. However, the system shown in FIG. 3 is also applicable to video information in which adjacent frames have different formats. An example is MPEG (Motion Picture Experts Group), which contains JPEG-like frames along with information for interpolating other frames between the JPEG-like frames. The interpolating information is different from the JPEG-like frames. In one embodiment of the present invention, only the centrally located regions of the JPEG-like frames need to be encrypted. The interpolating information does not have to be encrypted. In this case, substantially all the correlated portions of movie is encrypted.

One of the advantages of the method of FIG. 3 is that only a small bandwidth needs to be used for transmitting the encrypted portion. In many applications, only about 1% of the area of a frame needs to be encrypted. Thus, the bandwidth of the communication channel linking the secure processor and the central station is about 1% of the bandwidth of the communication link coupled to the general processor.

Figure 4:
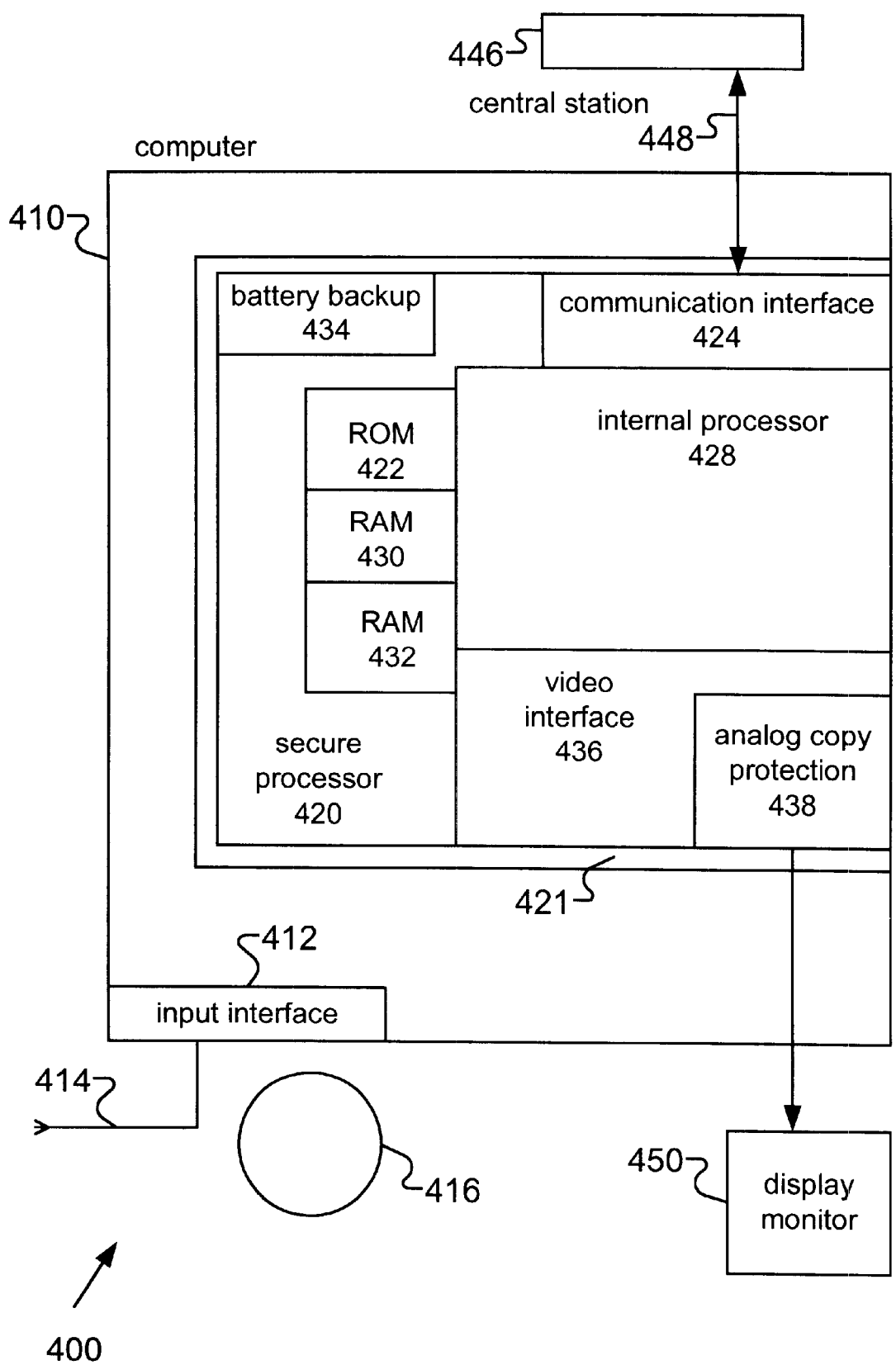
FIG. 4 is a block diagram of a software distribution and processing system of the present invention.

A software distribution and processing system 400 in accordance with the present invention is shown in FIG. 4. Examples of software include movie, games, and computer executable codes. System 400 includes a computer 410 (such as computers make by Apple and IBM) containing a conventional input interface 412. Input interface 412 could be a high speed communication port connected to a communication link, such as cable or telephone lines 414, or an memory reader, such as a CD-ROM reader for reading a CD-ROM 416. Input interface 412 accepts unencrypted data either from a remote site or CD-ROMs stored in the user site.

Computer 410 is coupled to a secure processor 420 that contains means 421 for preventing unauthorized probing into its internal structure (both mechanical and electrical). The communication between computer 410 and secure processor 420 does not have to be secure. Secure processor 420 could be a board inserted into a bus of computer 410 or an external device coupled to an input/output port of computer 410. If it is possible to integrate all the functions of secure processor 420 into a chip, secure processor could be incorporated directly into the motherboard of computer 410.

Secure processor 420 contains a nonvolatile storage area 422 (e.g., ROM) for storing, among other data, a secret key and a device ID that is unique to the secure processor. Secure processor 420 also contains a communication interface 424 for communicating with a central station 446 via a communicating link 448. Communicating link 448 does not have to be secure, and can be a regular telephone line or wireless link. Communication link 448 can also be a broadcasting channel wherein central station 446 can broadcast information to software distribution and processing system located in a large number of user sites.

Preferably, communication interface 424 contains means for error detection and correction. Communication interface 424 preferably contains means for allowing mutual authentication between secure processor 420 and central station 446. Such authentication means are well known. Examples of such means are disclosed in "Applied Cryptography: Protocols, Algorithms, and Source Code in C," published 1994 by John Wiley & Sons, Inc., and the references cited therein.

Communication interface 424 also contains means for allowing central station 446 to send a decryption key and other secret data to secure processor 420, preferably after authentication has been confirmed. It also allows secure processor 420 to send secret data, such as accounting data, to central station 446. Means for sending data (e.g., keys) securely via an insecure communication channel are well known. Examples of such means are key exchange protocols disclosed in "Applied Cryptography: Protocols, Algorithms, and Source Code in C," published 1994 by John Wiley & Sons, Inc., and the references cited therein.

If communication link 448 is a broadcasting communication link, central station 446 can broadcast the key and secret data on link 448. Communication interface 424 can listen to link 448 and retrieve information directed thereto. Other software distribution and processing systems connected to link 448 would not be able to retrieve such information. Examples of secret broadcasting are also disclosed in "Applied Cryptography: Protocols, Algorithms, and Source Code in C," published 1994 by John Wiley & Sons, Inc., and the references cited therein.

Secure processor 420 contains an internal processor 428 and RAM 430 that together perform, among other tasks, authentication, decryption, and/or decompression. The central station 446 may also send instructions (in encrypted form) to internal processor 428 for execution. These instructions may be part of a decryption algorithm for decryption a particular piece of encrypted data sent by central station 446 to secure processor 420. The instruction set of internal processor 428 is preferably hidden from the general public. As a result, it is difficult for an unauthorized person to execute these instructions, even if the decryption key is inadvertently discovered by such person.

Secure processor 420 also contains RAM 432 for storing accounting data. Examples of accounting data are the number of times a user played a distributed software, the length of time a user executes the software, and personal data of a user, such as his/her credit card number. At predetermined time intervals, the accounting data is communicated to central station 446 via communication link 448 using the above described key exchange protocols. In order to maintain the accounting data even when regular power to secure processor 420 is disrupted, a battery backup means 434 is preferably included in secure processor 420.

Secure processor 420 contains a video interface 436 for generating analog video signal for display by an external display monitor 450. In order to prevent unauthorized copying of the analog video signal, means 438 for generating analog copy protection signal is included in video interface 436.

As an example, the use of software distribution and processing system 400 to process movie is now described. It should be obvious to use system 400 for processing other types of software. A digitized version of the movie is separated into two sets of data in accordance with the methods described above: a plain-text portion and a residual portion. These two sets of data also contain linkage information and identification labels allowing secret processor 420 to later combine these two sets of data to reconstruct the original digitized movie. These sets of data are compressed using a publicly known algorithm (such as MPEG) or a proprietary algorithm. The compressed plain-text data is recorded in a portable storage medium (e.g., CD-ROM) or stored in a central library (which could be located at central station 446). The CD-ROMs are distributed to users at nominal costs.

A user who desires to play the movie can insert the CD-ROM to input interface 412 of computer 410 or connect input interface 412 to the central library via link 414, depending on the manner the plain-text data is distributed. Computer 410 decompressed the received data. It also retrieves the movie identification label from the received data and sends the label to secure processor 420. Secure processor 420 initiates an authentication procedure with central station 446. Upon confirmation of authenticity, secure processor 420 transmits the label and its device ID (stored in ROM 422) to central station 446. Central station 446 retrieves the corresponding residual portion of the digitized movie, in response to the received label. Central station 446 also generates an encryption-decryption key-pair (which could be the same or different keys, depending on the encryption method used) for encrypting the residual data. The decryption key is sent to secure processor 420 using a secure communication protocol described above. The encrypted portion of the digitized movie is also sent to secure processor 420.

In this embodiment, the encryption-decryption key-pair could be different for different communication sessions. Thus, the information providers have full control of the keys instead of relying on keys imposed by third parties. As pointed out above, prior art information distribution systems rely on cryptographic technology at the time the information is recorded on CD-ROM, which could be more than a year before a user decrypts the information. On the other hand, the present invention allows information providers to use the most advanced cryptographic technology at the time the information is used.

The present invention also allows information providers to tailor the encryption-decryption key-pair to their needs. Thus, if the information is extremely valuable, an information provider can use a secure encryption algorithm (with the associated increase in computation requirements). On the other hand, if the information is not quite valuable, the information provider can use a moderate secure algorithm.

Secure processor 420 decompresses and decrypts the encryption residual data using the decryption key received from the central station 446. At the same time, computer 410 sends the plain-text data to secure processor 420. Secure processor 420 combines the data and reconstructs the original digitized movie data. The result is sent to video interface 436.

In response to the digitized movie data, video interface 436 generates analog video signal. Even though the above described method and device is able to distribute and process digital signals securely, the analog output video signal could be recorded and copied. Thus, it may be desirable to include a system of analog copy protection 438 in video interface 436. Examples of such a system are described in U.S. Pat. Nos. 4,577,216 and 4,631,603 issued to Ryan. Alternatively, digital signals for generating analog copy protection signal may be embedded into the digitized movie data.

In another embodiment of system 400, the "unencrypted" set of data is actually encrypted using a simple encryption algorithm. This embodiment increases the cost of the system, and in return, improves the security of the system. Thus, the present invention offers different level of security to match the need of the information providers.

There has thus shown and described a novel information distribution and process system. Many changes, modifications, variations and other uses and application of the subject invention will become apparent to those skilled in the art after considering this specification and the accompanying drawings. All such changes, modifications, variations, uses, and applications are covered by the scope of this invention which is limited only by the appended claims.

I claim:

1. A method for generating graphic images by a plurality of processing units, each of said processing units being located in a separate remote site and connected to an output unit, each of said plurality of processing units connectable to a remote station via a first communication link, said method comprising the steps of:

distributing a first set of digital data to each of said plurality of processing units, said first set of digital data being unencrypted and comprising a content portion and an identification label;

processing said first set of digital data by at least two of said plurality of processing units, further comprising the following steps performed by each of said at least two processing units:

separating said first set of digital data into said content portion and said identification label;

sending said identification label to said remote station using said first communication link;

receiving a second set of digital data from said remote station using said first communication link, said second set of digital data being encrypted;

decrypting said second set of digital data to generate a third set of digital data;

generating a graphic image using said content portion and said third set of digital data; and delivering said graphic image to said output unit; and performing by said remote station the following steps:

receiving said identification label;

retrieving said second set of digital data in response to said identification label; and transmitting, using said first communication link, said second set of digital data to said at least two processing units.

2. The method of claim 1 wherein each of said at least two processing units further comprises memory for storing accounting data, said method further comprising a step of sending said accounting data by each of said at least two processing units to said remote station.

3. The method of claim 1 wherein each of said at least two processing units contains a device ID and said sending step further comprises a step of sending said device ID by each of said at least two processing units to said remote station.

4. The method of claim 1 wherein said graphic image comprises a JPEG image.

5. The method of claim 1 wherein said second set of digital data has a size approximately same as or less than one percent of that of said content portion.

6. The method of claim 1 wherein said step of distributing said first set of digital data includes distributing using a second communication link.

7. The method of claim 6 wherein each of said at least two processing units further comprises memory for storing accounting data, said method further comprising a step of sending said accounting data by each of said at least two processing units to said remote station.

8. The method of claim 6 wherein each of said at least two processing units contains a device ID and said sending step further comprises a step of sending said device ID by each of said at least two processing units to said remote station.

9. The method of claim 6 wherein said graphic image comprises a JPEG image.

10. The method of claim 6 wherein said second set of digital data has a size approximately same as or less than one percent of that of said first set of digital data.

11. The method of claim 1 wherein said first and said second sets of digital data are stored in said remote station.

12. The method of claim 1 wherein said first set of digital data is distributed using a broadcast communication link.

13. The method of claim 12 wherein each of said at least two processing units further comprises memory for storing accounting data, said method further comprising a step of sending said accounting data from each of said at least two processing units to said remote station.

14. The method of claim 12 wherein said graphic image contains a JPEG image.

15. A method for generating graphic images by a plurality of processing units, each of said processing units being located in a separate remote site and connected to an output unit, each of said plurality of processing units connectable to a remote station via a first communication link, said method comprising the steps of:

distributing a first set of digital data to each of said plurality of processing units, said first set of digital data comprising a content portion and an identification label, said first set of digital data being encrypted in a first level;

processing said first set of digital data by at least two of said plurality of processing units, further comprising the following steps performed by each of said at least two processing units:

decrypting said first set of digital data to obtain said content portion and said identification label;

sending said identification label to said remote station using said first communication link;

receiving a second set of digital data from said remote station using said first communication link, said second set of digital data being encrypted in a second level;

decrypting said second set of digital data to generate a third set of digital data;

generating a graphic image using said decrypted first set of digital data and said third set of digital data; and delivering said graphic image to said output unit; and performing by said remote station the following steps:

receiving said identification label;

retrieving said second set of digital data in response to said identification label; and transmitting, using said first communication link, said second set of digital data to said at least two processing units.

16. The method of claim 15 wherein said graphic image comprises a JPEG image.

17. The method of claim 15 wherein each of said at least two processing units contains a device ID and said sending step further comprises a step of sending said device ID by each of said at least two processing units to said remote station.

18. The method of claim 15 wherein each of said at least two processing units further comprises memory for storing accounting data, said method further comprising a step of sending said accounting data by each of said at least two processing units to said remote station.

19. The method of claim 15 wherein said second set of digital data has a size approximately same as or less than one percent of that of said content portion.

20. The method of claim 15 wherein said first set of digital data is distributed using a broadcast communication link.

21. The method of claim 20 wherein each of said at least two processing units contains a device ID and said sending step further comprises a step of sending said device ID by each of said at least two processing units to said remote station.

22. The method of claim 20 wherein each of said at least two processing units further comprises memory for storing accounting data, said method further comprising a step of sending said accounting data by each of said at least two processing units to said remote station.

23. The method of claim 20 wherein said second set of digital data has a size approximately same as or less than one percent of that of said content portion.

* * * * *